United States Patent
Krueger et al.

(10) Patent No.: US 7,668,977 B2
(45) Date of Patent: Feb. 23, 2010

(54) METHOD FOR EXCHANGING INFORMATION BETWEEN DEVICES CONNECTED VIA A COMMUNICATION LINK

(75) Inventors: Martin Krueger, Munich (DE); Erwin Huber, Munich (DE)

(73) Assignee: Infineon Technologies Austria AG, Villach (AT)

( * ) Notice: Subject to any disclaimer, the term of this patent is extended or adjusted under 35 U.S.C. 154(b) by 119 days.

(21) Appl. No.: 11/854,270

(22) Filed: Sep. 12, 2007

(65) Prior Publication Data

US 2009/0070505 A1    Mar. 12, 2009

(51) Int. Cl.
G06F 3/00    (2006.01)
(52) U.S. Cl. .................... 710/10; 710/105; 710/110
(58) Field of Classification Search ............... 710/8–10, 710/19, 105, 106, 110, 305, 315
See application file for complete search history.

(56) References Cited

U.S. PATENT DOCUMENTS

| | | | |
|---|---|---|---|
| 5,724,599 A | | 3/1998 | Balmer et al. |
| 5,770,928 A | | 6/1998 | Chansky et al. |
| 5,918,059 A | | 6/1999 | Tavallaei et al. |
| 6,025,695 A | * | 2/2000 | Friel et al. ............... 320/106 |
| 6,233,625 B1 | | 5/2001 | Vander Kamp et al. |
| 6,408,394 B1 | | 6/2002 | Vander Kamp et al. |
| 6,445,716 B1 | * | 9/2002 | Favichia et al. .......... 370/466 |
| 6,691,257 B1 | * | 2/2004 | Suffin .................... 714/43 |
| 6,912,606 B2 | * | 6/2005 | Fay ...................... 710/64 |
| 7,171,542 B1 | * | 1/2007 | Alfano et al. ............. 712/38 |
| 7,451,244 B2 | * | 11/2008 | Kostadinov ............... 710/11 |
| 2003/0065877 A1 | | 4/2003 | Gillingham et al. |
| 2003/0169073 A1 | | 9/2003 | Takiba et al. |
| 2004/0128565 A1 | * | 7/2004 | Horigan .................. 713/300 |
| 2005/0080950 A1 | * | 4/2005 | Rollig et al. .............. 710/52 |
| 2008/0123677 A1 | * | 5/2008 | Cooley et al. ............. 370/419 |
| 2008/0215780 A1 | * | 9/2008 | Deshpande et al. ........ 710/110 |

FOREIGN PATENT DOCUMENTS

DE    19832825 A1    12/1999

(Continued)

OTHER PUBLICATIONS

SMBus Control Method Interface Specification, version 1.0, Dec. 10, 1999.*
Understanding and Using PMBus Data Formats, IEEE 2006.*

(Continued)

*Primary Examiner*—Khanh Dang
(74) *Attorney, Agent, or Firm*—Banner & Witcoff, Ltd.

(57) ABSTRACT

A method for exchanging information between a first device and a second device connected via a communication link, the communication link supporting a query command and at least a further command, where each command includes a specific command code is described. The method comprises transmitting a query command code and data from the first device via the communication link, the data identifying a specific command, receiving the query command code and the data at the second device, transmitting reply data from the second device via the communication link, the reply data including at least a first segment and a second segment, and receiving the reply data at the first device, wherein the first segment includes information whether the specific command is supported, wherein, if the specific command is not supported, the second segment includes information identifying an alternative command to the specific command.

25 Claims, 2 Drawing Sheets

FOREIGN PATENT DOCUMENTS

| | | |
|---|---|---|
| EP | 0706110 A2 | 4/1996 |
| EP | 1338974 A2 | 8/2003 |
| KR | 20060028572 | 3/2006 |
| WO | 9855924 | 12/1998 |
| WO | 20000041073 A1 | 7/2000 |
| WO | 2006070906 A1 | 7/2006 |
| WO | 2006073220 A1 | 7/2006 |

OTHER PUBLICATIONS

PMBusTM Power System Management Protocol Specification, Part II—Command Language, Revision 1.1 (Feb. 5, 2007), www.powerSIG.org System Management Interface Forum, 98 pages.

* cited by examiner

| Bits | Value | Meaning | |
|---|---|---|---|
| 7 | 1 | command is supported | |
|  | 0 | command is not supported | |
| Bits | Value | Meaning if bit 7 is one | Meaning if bit 7 is zero |
| 6 | 1 | command is supported for write | "don't care" |
|  | 0 | command is not supported for write | |
| 5 | 1 | command is supported for read | |
|  | 0 | command is not supported for read | |
| 4:2 | 000 | linear data format is used | |
|  | 011 | direct format is used | |
|  | 101 | a specific code (VID mode) is used | |
|  | 110 | manufacturer specific format is used | |
| 1:0 |  | reserved | |

Fig. 3

| Bits | Value | Meaning | |
|---|---|---|---|
| 7 | 1 | command is supported | |
|  | 0 | command is not supported | |
| Bits | Value | Meaning if bit 7 is one | Meaning is bit 7 is zero |
| 6 | 1 | command is supported for write | substitute command available |
|  | 0 | command is not supported for write | substitute command not available |
| 5 | 1 | command is supported for read | code bits 5:0 of substitute command if available, else "don't care" |
|  | 0 | command is not supported for read | |
| 4:2 | 000 | linear data format is used | |
|  | 011 | direct format is used | |
|  | 101 | a sepcific code (VID mode) is used | |
|  | 110 | manufacturer specific format is used | |
| 1:0 |  | reserved | |

Fig. 4

METHOD FOR EXCHANGING INFORMATION BETWEEN DEVICES CONNECTED VIA A COMMUNICATION LINK

BACKGROUND

The Power Management Bus (PMBus) is an open standard power-management protocol with a fully defined command language that facilitates, for example, communication with power converters and other devices in a power system. The bus protocol is implemented over the industry-standard System Management Bus (SMBus) serial interface and enables programming, control, and real-time monitoring of compliant power conversion products. This flexible and highly versatile standard allows for communication between devices based on both analog and digital technologies, and provides true interoperability which will reduce design complexity and shorten time to market for power system designers. Pioneered by leading power supply and semiconductor companies, this open power system standard is maintained and promoted by the PMBus Implementers Forum (PMBus-IF).

There are two parts to the PMBus specification. Part I includes the general requirements and defines the transport and electrical interface and timing requirements of hardwired signals. Part II defines the command language for PMBus.

The PMBus protocol covers a wide range of power system architectures and converters. However, not all PMBus devices must support all of the available features, functions and commands. In the context of PMBus communication, the term "devices" refers, e.g., to a specific power management product; that may be inter alia, a compliant integrated circuit, a power converter, a power supply, etc.

The open communications interface specification offers enhancements which simplify the management of system power supplies while extending the PMBus protocol to address the needs of AC/DC supplies as well as DC/DC converters.

To comply with the PMBus standard, a device does not need to support all of the specified PMBus standard commands. Moreover, several commands may be supported in different ways and the PMBus standard also allows for the definition of non-standard manufacturer specific commands. If a PMBus host transmits a command not supported by the receiving device, the device notifies the host accordingly. However, this requires some transmit and receive interactions which may be time-consuming. In many cases it is desirable to determine as soon as possible whether a certain command is supported by a PMBus device or not to allow for early decisions in the PMBus host. A try-and-error strategy to find out the commands supported by a device is often inappropriate, since the actual execution of the tried commands is often not desirable and "neutral" command parameters—that is, parameters which do not have an effect on the receiving device—can not always be found.

A command "QUERY" has been introduced into the standard which allows a PMBus host to "ask" a bus device whether it supports a certain PMBus standard or manufacturer specific command. In reply to a received QUERY command, the device "answers" either with "command supported" or "command not supported." However, the standard QUERY command is not designed to include manufacturer alternative commands which may be used instead of the queried command. In order to facilitate bus communication, there is a need for an accordingly enhanced QUERY command.

However, this need is not limited to PMBus communication. Any generic communication protocol used with a generic communication link (two-wire serial bus, parallel bus, wireless connection, etc.) may benefit from such an enhancement.

SUMMARY

In light of the foregoing background, the following presents a simplified summary of the present disclosure in order to provide a basic understanding of some aspects of the invention. This summary is not an extensive overview of the invention.

One example of the invention relates to a method for exchanging information between a first device and a second device connected via a communication link, the communication link supporting a query command and at least a further command, where each command includes a specific command code. The method comprises transmitting a query command code and data from the first device via the communication link, the data identifying a specific command, receiving the query command code and the data at the second device, transmitting reply data from the second device via the communication link, the reply data including at least a first segment and second segment, and receiving the reply data at the first device, wherein the first segment includes information whether the specific command is supported, wherein, if the specific command is not supported, the second segment includes information identifying an alternative command to the specific command.

These and other aspects will be described herein. This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The invention can be better understood with reference to the following drawings and description. The components in the figures are not necessarily to scale; instead, emphasis is placed upon illustrating the principles of the invention. Moreover, in the figures, like reference numerals designate corresponding parts. In the drawings:

FIG. 3 is a table of the QUERY command reply data byte format according to the PMBus specification Revision 1.1.

FIG. 4 is a table of the QUERY command reply data byte of an enhanced QUERY command.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

An example of the invention relates to a method for exchanging information between a first device and a second device connected via a SMBus compliant communication link and adapted for communicating with each other according to a PMBus standard which supports a query command and further commands each command being represented by an n-bit command code. The method comprises transmitting a command code representing a query command and an n-bit unsigned integer data word over the SMBus compliant communication link from the first device, a bit size of the data word being equal to a bit size of the command code of a specific command, receiving the command code and the data word at the second device, transmitting a reply data word over the SMBus compliant communication link from the second device, the reply data word including a first segment of one bit and second segment of n–1 bits, and receiving the reply data word at the first device, wherein the one bit of the first segment identifies whether the specific command is supported, wherein, if the specific command is not supported, the second segment includes a first sub-segment of one bit identifying if an alternative command to the specific command is available and a second sub-segment including bits representing at least a part of the command code of the alternative command.

A further example of the invention covers a device connected to a communication link and configured to receive there from a query command code and data, the device further configured to transmit reply data via the communication link, the reply data including at least a first segment and a second segment, wherein the first segment includes information identifying whether the specific command is supported, and wherein the second segment includes information identifying an alternative command to the specific command.

Another example of the invention relates to a PMBus compliant device connected to a SMBus compliant communication link and configured to receive there from a query command code and an 8-bit unsigned integer data word representing a command code of a specific command, the device further configured to transmit via the communication link a reply data word including a first segment of one bit and a second segment of 7 bits, wherein the second segment includes a first sub-segment of one bit identifying if an alternative command to the specific command is available and a second sub-segment including bits representing at least a part of the command code of the alternative command.

Figure 1:
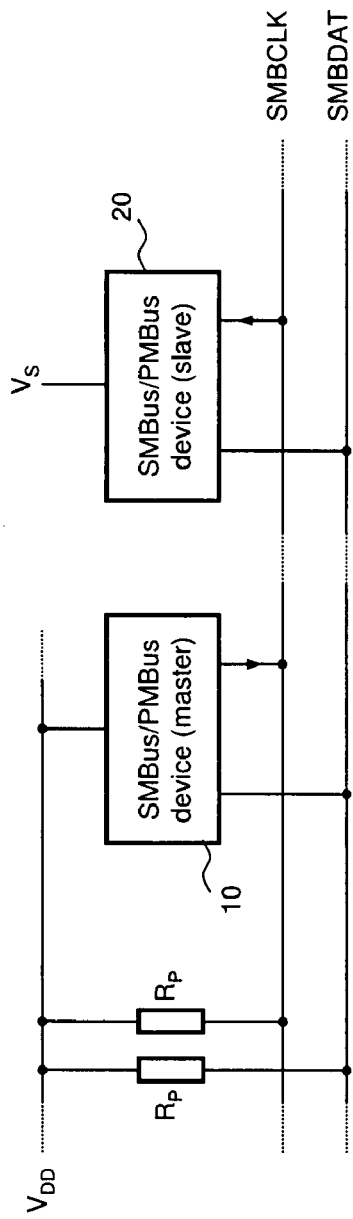
FIG. 1 is a block diagram illustrating the basic bus infrastructure of the SMBus and the PMBus.

FIG. 1 is a block diagram illustrating the basic bus infrastructure compliant to the System Management Bus (SMBus) standard and the Power Management Bus (PMBus) standard. Both, the SMBus and the PMBus use the same bus infrastructure, where the PMBus may be regarded as an enhanced and specialized version of the SMBus being compatible thereto.

PMBus is a two-wire bus similar to the well-known I²C bus. At least two PMBus devices are connected in series via a data line SMBDAT and a clock line SMBCLK. One of the devices connected to the bus has to be the bus master 10 capable of driving the clock line SMBCLK with a clock signal and capable of initiating data transfer over the data line. The other devices operate as bus slaves 20 communicating with the bus master 10, where the communication is synchronized by the bus master 10 via the clock line SMBCLK. To operate correctly, the data line SMBDAT and a clock line SMBCLK are connected with a power supply providing a voltage $V_{DD}$ between 3V and 5V via pull up resistors $R_P$. The PMBus devices 10, 20 may also be supplied from the same power supply $V_{DD}$ or from a separate supply $V_S$.

Figure 2:
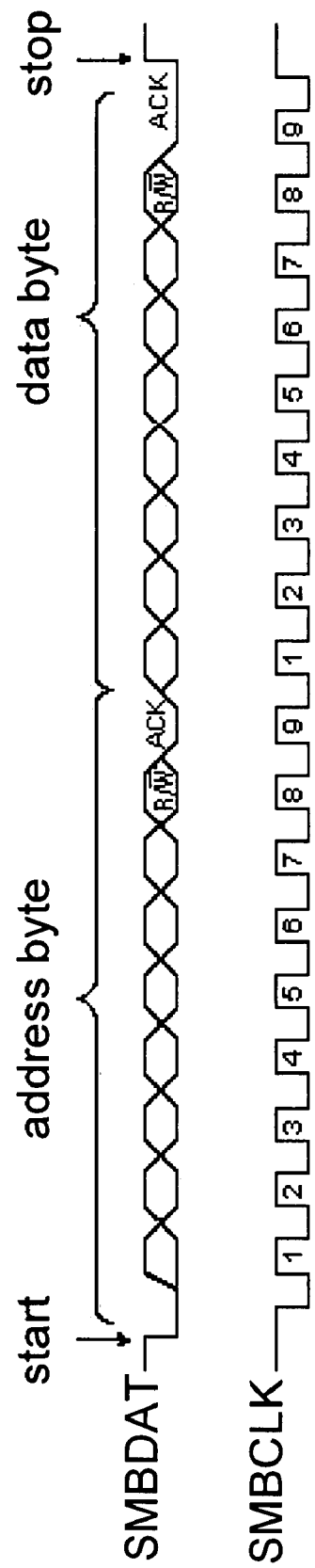
FIG. 2 is a timing diagram illustrating the data transfer mechanism over the SMBus and the PM bus lines.

FIG. 2 is a timing diagram illustrating the data transfer mechanism over the SMBus lines, respectively PMBus lines, i.e., over the clock line SMBCLK and the data line SMBDAT. Bus communication is initiated by the bus master 10 by pulling data line SMBDAT to a low level and starting to drive the clock line SMBCLK with the clock signal. Address and data bits are transmitted to and/or received from the data line SMBDAT synchronously to the clock signal, where a transition in the data signal from a low level (logic 0) to a high level (logic 1) always occurs during a low level of the clock signal. Although the data signal depicted in FIG. 2 only includes one address byte or one data byte, an actual data signal may include more than one data byte and/or more than one address byte. In this case, a multi-byte address word and/or a multi-byte data word may be used instead.

The address word (or address byte) identifies the transmitting or receiving bus slave device and the data word (or the data byte) may comprises a command code identifying a bus command that is to be executed by the receiving bus slave device, the command code may be followed by data bits.

The bus communication will be further explained with reference to an example where a bus master device 10 transmits a QUERY command to a bus slave device 20 and the bus slave device 20 replies with reply data byte. The QUERY command is specified in revision 1.1 of the PMBus specification. Accordingly the QUERY command may be used to ask a PMBus device if it supports a specified command, and if so, what data formats is supports for that specified command (cf. System Management Interface Forum, ed., PMBuS™ Power System Management Protocol Specification Part II—Command Language, Revision 1.1, Feb. 5, 2007).

In the following, hexadecimal numbers have an additional "h" and binary numbers have an additional "b" following the least significant digit. Of course the most right digit is the least significant one. For example, bus master device 10 wants to determine whether a slave device 20 with an address 03*h* (or 00000011b) supports the PMBus command VOUT_COMMAND which has a command code 20*h* (or 00100000b). The QUERY command itself has the command code 1Ah (00011010b). The bit sequence generated on the data line SMBDAT will be "00000011 00011010 00100000," where the left eight digits are the 8 bits of the address byte, the right sixteen digits form the data word, comprising the command code (middle eight bits) of the QUERY command and—as a parameter for the QUERY command—the command code (right eight bits) of the command to be queried.

The receiving bus slave device 20 decodes the address byte and—if the decoded address matches the address of the slave device—the data byte and executes the QUERY command. As a result, the bus slave device 20 sends a response over the data line SMBDAT with the bit sequence "00000011 00000000," where the left eight digits again form the address byte of the respective slave device 20 and the right eight digits form the data word representing the actual response of the slave device 10 to the QUERY command. How this response data byte has to be interpreted can be seen in the table of FIG. 3. In the above example, the response means "command not supported."

FIG. 3 gives an overview of the QUERY command response data byte as defined by revision 1.1 of the PMBus specification, where bit no. 0 is the least significant bit (LSB) and bit no. 7 the most significant bit (MSB) of the response data byte. Bit no. 7 is "1" if the queried command is supported and "0" if it is not supported. In the latter case (command not supported), bit nos. 0 to 6 are indefinite, i.e., they have no meaning and a device receiving the response byte shall not care. In case the queried command (VOUT_COMMAND in the above example) is supported, bit nos. 2 to 6 specify whether the command is supported for write operations (bit no. 6 is "1" if yes, else "0") and whether the command is supported for read operations (bit no. 5 is "1" if yes, else "0"). Bit nos. 2 to 4 define the specific data format that is used with the queried command. Bit nos. 0 and 1 are reserved for future use.

The proposed enhancement of the QUERY command is illustrated by FIG. 4. In the case the queried command is not supported (bit no. 7 is "0"), the bit nos. 0 to 6, which are indefinite according to the PMBus standard, are used to encode an alternative command and additional information concerning the use of the alternative command. In the example of FIG. 4, bit no. 6 defines whether an alternative command is available (bit no. 6 is "1") or is not available (bit no. 6 is "0"). The word comprising the bit nos. 0 to 5 defines at least a part of the command word of the alternative command. In the present example, a maximum of 64 different alternative commands can be encoded, since 6 bits are available. According to the standard, 46 command codes are reserved for manufacturer specific commands. The command codes for these manufacturer specific range from D0*h* (11010000b) to FDh (1111110b). As one can see, the two most significant bits of the command code of any manufacturer specific command are "11." To retrieve the full 8-bit command code, the device receiving the response byte has to "know" the two "missing bits" which is no problem since these are always "11." The device receiving the response byte has to concatenate the command code of the alternative command by appending bit nos. 5 to 0 to the two a-priori known bits "11."

If the address range for the alternative commands is reduced to a maximum of 32 commands, only five bits are needed to encode the alternative command. In this case, the three most significant bits of the command code of the alternative command have to be a-priori "known", e.g. "111." However, reducing the address range for alternative commands allows for using the bits not needed for encoding the alternative command code for providing further information. Such information might comprise information whether the alternative command is supported for write and/or read operations or whether the alternative command is fully compatible with the queried command or not, that is whether the alternative command can be used analogous to the queried command without any risk of malfunction.

In the examples given above, always a bus master device operates as "sender" transmitting the QUERY command which a bus slave device is responding to. Of course it could also be the bus slave device querying the bus master device or another slave device, too.

Although various examples to realize the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

The invention claimed is:

1. A method for exchanging information between a first device and a second device connected via a communication link, the communication link supporting a query command and at least a further command, each command including a specific command code, the method comprising:
   transmitting a query command code and data from the first device via the communication link, the data identifying a specific command;
   receiving the query command code and the data at the second device;
   transmitting reply data from the second device via the communication link, the reply data including at least a first segment and second segment; and
   receiving the reply data at the first device,
       wherein the first segment includes information indicating whether the specific command is supported,
       wherein, if the specific command is not supported, the second segment includes information identifying an alternative command to the specific command,
       wherein the first segment of the reply data is a 1-bit word and the second segment of the reply data is a 7-bit word.

2. The method of claim 1, wherein the communication link is a serial bus connection.

3. The method of claim 2, wherein the serial bus connection complies with a SMBus standard.

4. The method of claim 1, wherein each command code includes 8 bits.

5. The method of claim 4, wherein the command code of the query command includes 8 bits represented by the binary number 00011010 or the hexadecimal number 1A.

6. The method of claim 4, wherein the data is an 8-bit unsigned integer word.

7. The method of claim 6, wherein the data comprises 8 bits that correspond to the command code of the specific command.

8. The method of claim 1, wherein the reply data is an 8-bit unsigned integer word.

9. The method of claim 1, wherein the 1-bit word of the first segment of the reply data is a most significant bit of the reply data.

10. The method of claim 1, wherein the second device sets the 1-bit word of the first segment of the reply data to "0" if the specific command is not supported and to "1" if the specific command is supported.

11. The method of claim 1, wherein the second segment of the reply data includes a first sub-segment and a second sub-segment, the first sub-segment including a single bit.

12. The method of claim 11, wherein the second device sets the single bit in the first sub-segment to "0" if an alternative command is not available and to "1" if an alternative is available.

13. The method of claim 11, wherein the second sub-segment includes a 6-bit word representing six bits of the 8-bit command code of the alternative command to the specific command.

14. The method of claim 13, wherein the remaining two bits of the 8-bit command code of the alternative command are "11".

15. The method of claim 11, wherein the second segment of the reply data includes a third sub-segment, the third sub-segment including at least one bit and the second sub-segment including less than six bits.

16. The method of claim 15, wherein the at least one bit of the third sub-segment includes information representative of whether the alternative command supports writing and reading.

17. The method of claim 16, wherein one bit of the third sub-segment identifies whether the alternative command is operable in the same way as the specific command.

18. A method for exchanging information between a first device and a second device connected via a SMBus compliant communication link and adapted for communicating with each other according to a PMBus standard which supports a query command and further commands each command being represented by an n-bit command code, the method comprising:
   transmitting a command code representing a query command and an n-bit unsigned integer data word over the SMBus compliant communication link from the first device, the data word indicating the command code of a specific command;

receiving the command code and the data word at the second device;

transmitting reply data over the SMBus compliant communication link from the second device, the reply data including a first segment of one bit and a second segment of n-1bits; and receiving the reply data at the first device;

wherein the one bit of the first segment identifies whether the specific command is supported, wherein, if the specific command is not supported, the second segment includes a first sub-segment of one bit identifying if an alternative command to the specific command is available and a second sub-segment including bits representing at least a part of the command code of the alternative command.

19. The method of claim 18, wherein the part of the command code not represented by the bits of the second sub-segment is a-priori known.

20. The method of claim 18, wherein the second sub-segment includes six bits representing the six least significant bits of the command code of the alternative command, wherein the two most significant bits of the command code of the alternative command are "11".

21. A device connected to a communication link and configured to receive there from a query command code and data, the device further configured to transmit reply data via the communication link, the reply data including at least a first segment and a second segment, wherein the first segment includes information identifying whether a specific command is supported, and wherein the second segment includes information identifying an alternative command to the specific command, and wherein the first segment of the reply data is a 1-bit word and the second segment of the reply data is a 7-bit word.

22. A PMBus compliant device connected to a SMBus compliant communication link and configured to receive there from a query command code and an 8-bit unsigned integer data word representing a command code of a specific command, the device further configured to transmit via the communication link a reply data word including a first segment of one bit and a second segment of 7 bits, wherein the second segment includes a first sub-segment of one bit identifying if an alternative command to the specific command is available and a second sub-segment including bits representing at least a part of the command code of the alternative command.

23. The device of claim 22, wherein the part of the command code not represented by the bits of the second sub-segment is a-priori known.

24. The device of claim 22, wherein the second sub-segment includes six bits representing six bits of the command code of the alternative command, wherein the two remaining bits of the command code of the alternative command are "11".

25. A method for exchanging information between a first device and a second device connected via a communication link, the communication link supporting a query command and at least a further command, each command including a specific command code, the method comprising:

transmitting a query command code and data from the first device via the communication link, the data identifying a specific command;

receiving the query command code and the data at the second device;

transmitting reply data from the second device via the communication link, the reply data including at least a first segment and second segment; and receiving the reply data at the first device, wherein the first segment includes information indicating whether the specific command is supported, wherein, if the specific command is not supported, the second segment of the data includes a first sub-segment and a second sub-segment, the first sub-segment indicating whether an alternative command is available, the second sub-segment representing at least a part of the command code of the alternative command.

* * * * *